United States Patent [19]

Huddleston

[11] Patent Number: 4,649,644
[45] Date of Patent: Mar. 17, 1987

[54] CIRCULAR SAW CONVERSION ADAPTER

[75] Inventor: Earl M. Huddleston, Tustin, Calif.

[73] Assignee: Hudd Enterprises, Las Vegas, Nev.

[21] Appl. No.: 742,491

[22] Filed: Jun. 7, 1985

[51] Int. Cl.⁴ .............................................. B25F 3/00
[52] U.S. Cl. ...................................... 30/122; 30/383; 30/500
[58] Field of Search ................... 30/122, 500, 381–387

[56] References Cited

U.S. PATENT DOCUMENTS

| | | | |
|---|---|---|---|
| 2,839,097 | 6/1958 | Siria | 30/122 |
| 2,879,814 | 3/1959 | Scott | 30/500 |

FOREIGN PATENT DOCUMENTS

| | | | |
|---|---|---|---|
| 746304 | 1/1964 | Canada | 30/382 |
| 22573 | 1/1981 | European Pat. Off. | 30/386 |

Primary Examiner—Douglas D. Watts
Attorney, Agent, or Firm—Morland C. Fischer

[57] ABSTRACT

An adapter having particular application to quickly and easily convert a portable worm driven circular power saw into a sprocket driven chain saw. The adapter comprises an adjustable compression ring portion which is adapted to be attached to the existing bearing plate of the circular saw without requiring a removal of the bearing plate. Coextensively formed with the adapter compression ring portion is a base portion having a structure which permits a cutting chain bar and a cutting chain safety guard to be connected to opposite faces of the base portion. Thus, a circular cutting blade may be replaced by a cutting chain, and vice versa, without removing the existing bearing plate, as is commonly required when a conventional converison apparatus is utilized.

5 Claims, 7 Drawing Figures

CIRCULAR SAW CONVERSION ADAPTER

BACKGROUND OF THE INVENTION

1. Field of the Invention

This invention relates to a one-piece, adjustable compression adapter which is to be attached to the existing bearing plate of a circular power saw to quickly and easily convert the worm driven circular saw to a sprocket driven chain saw which is capable of making smooth, deep cuts with both precision and accuracy.

2. Prior Art

Attachments are known by which to convert a circular saw into a chain saw. Examples of such known attachments may be found be referring to U.S. Pat. No. 4,033,035 issued July 5, 1977 and to the documents listed therein.

However, as a shortcoming of most known conversion attachments, an existing bearing plate, common to the conventional circular saw, must first be removed before the adapter can be attached and the circular cutting blade replaced by a cutting chain. Such a removal and replacement typically requires the user to remove several screws and washers. Of course, once the chain saw conversion has been made, the bearing plate must then be replaced. This removal and replacement process of the existing bearing plate is sometimes difficult and time consuming. Moreover, the screws and washers for such bearing plate may be lost. What is more, the conventional conversion attachment may not have application to all, or to substantially all, commercially available circular saws.

Therefore, it is the principal object of the present invention to provide an adjustable adapter which may be quickly and easily attached to the existing bearing plate of a circular power saw to permit a circular cutting blade to be replaced by a cutting chain, and vice versa, without requiring the user to first remove the bearing plate in order to accomplish this conversion.

It is another important advantage of the present invention for the adapter to provide a secure mount for the chain saw bar so that the associated cutting chain can make smooth cuts with precision and accuracy and thereby avoid the relatively rough and hard to control cut which is characteristic of conventional chain saws.

SUMMARY OF THE INVENTION

Briefly, and in general terms, a one-piece adapter is disclosed having particular application to quickly and easily convert a portable worm driven circular saw, typically having a 3 inch cut, to a sprocket driven chain saw, typically having a 12 inch cut. The adapter comprises a ring-shaped portion which is adapted to be attached to the existing bearing plate within the housing of the circular saw. The ring-shaped portion includes a pair of adjustable compression legs which are arranged in spaced alignment with one another to establish a variable gap therebetween. The ring-shaped portion is positioned around an existing cylindrical member of the bearing plate, and the adjustable compression legs are tightened together to thereby reduce the size of the gap and secure the ring-shaped portion to the cylindrical member. A sprocket drive assembly is then connected to the existing rotor of the circular saw for driving the cutting chain.

The present adapter also comprises a base portion which is coextensively formed with and extended outwardly from the ringshaped portion. The base portion has a configuration by which to permit a chain saw bar to be securely connected to one face thereof and a chain saw safety guard to be connected to the opposite face. An endless cutting chain of conventional design is moved into engagement with the sprocket drive assembly and positioned around the chain bar. Accordingly, and by virtue of the present invention, the disclosed adapter may be attached to the existing bearing plate to conveniently permit a circular cutting blade to be replaced by a cutting chain, and vice versa, without requiring the user to first remove the bearing plate. Moreover, and by virtue of the secure connection of the saw bar to the present adapter, the cutting chain will advantageously be adapted to make relatively deep, smooth cuts with both precision and accuracy.

DESCRIPTION OF THE PREFERRED EMBODIMENT

Figure 1:
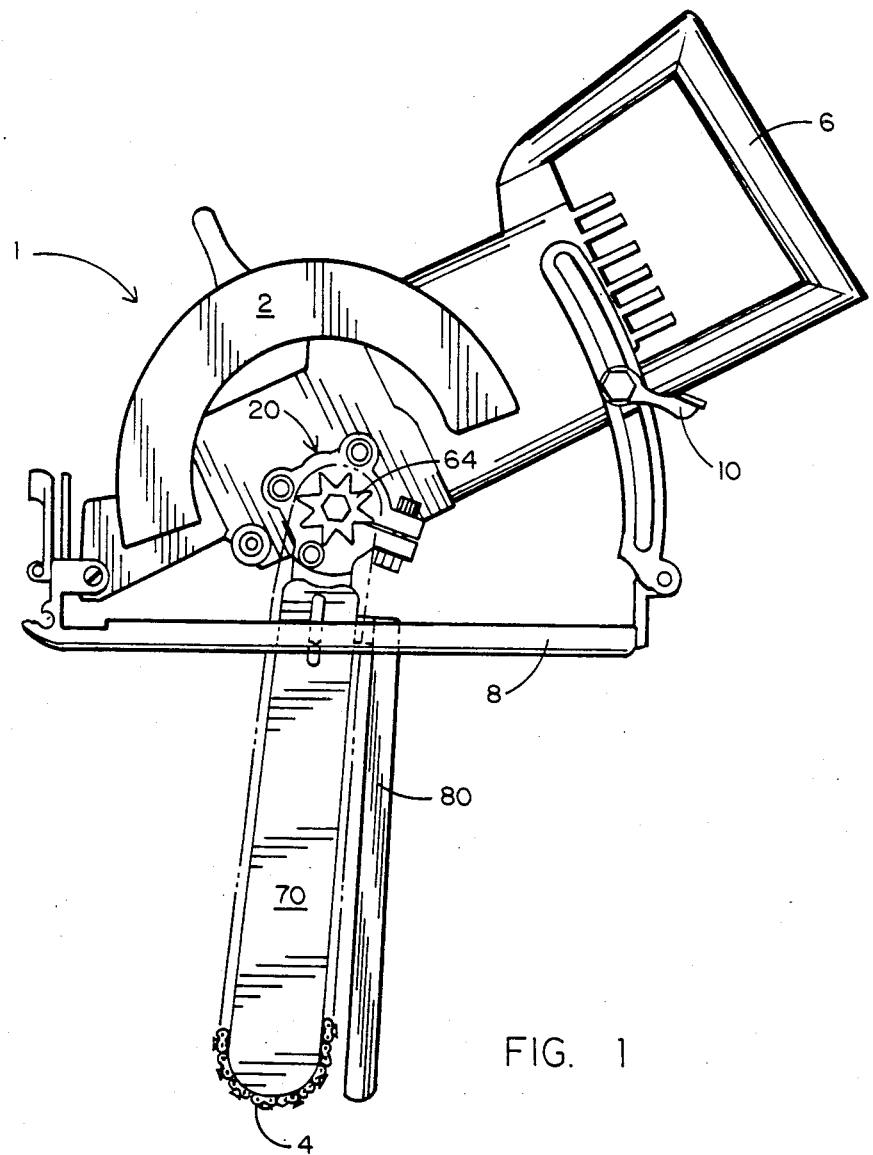
FIG. 1 is a side elevation of a circular power saw housing having the compression adapter and a sprocket drive assembly which form the present invention.
Figure 2:
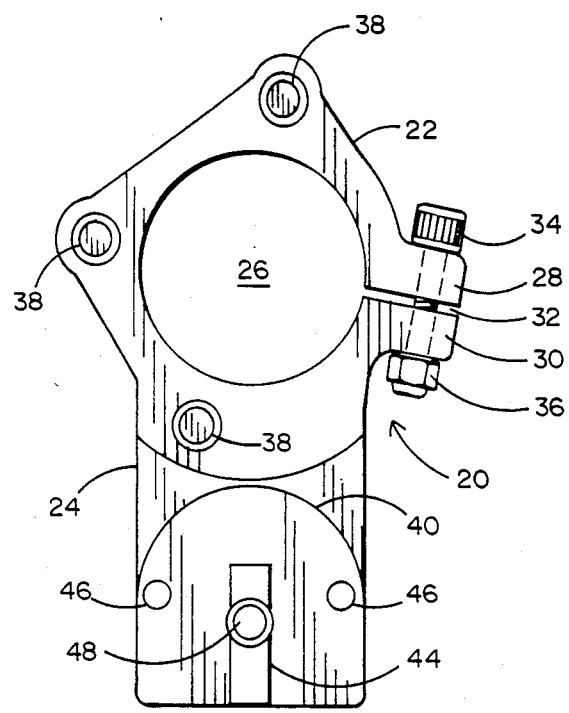
FIG. 2 is a detailed front view of the compression adapter of FIG. 1.
Figure 3:
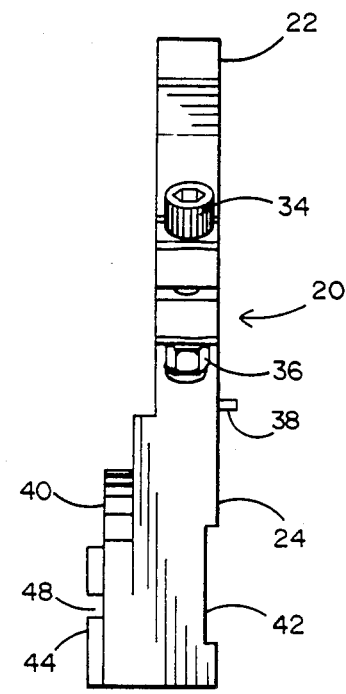
FIG. 3 shows one side of the compression adapter of FIG. 1.
Figure 4:
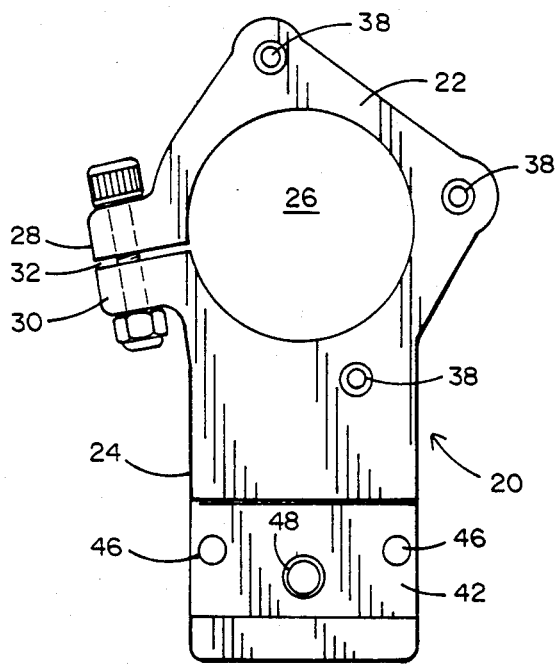
FIG. 4 is a detailed rear view of the compression adapter of FIG. 1.
Figure 5:
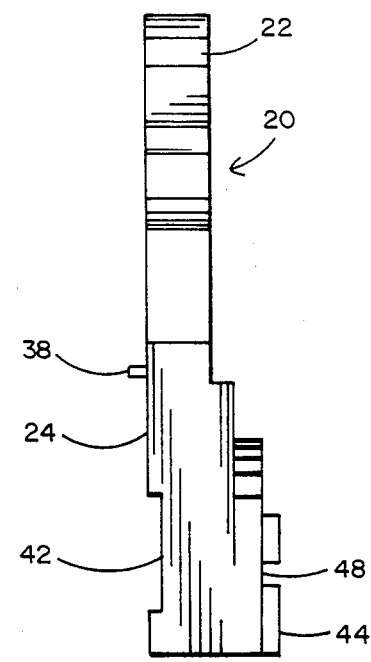
FIG. 5 shows the opposite side of the compression adapter of FIG. 1.

Referring to FIG. 1 of the drawings, there is shown a portable circular power saw 1 with the circular cutting blade removed and a cutting chain 4, a compression adapter 20, a sprocket drive 64, a chain bar 70, and a safety guard 80 substituted therefor. The circular saw 1 is of conventional design, including the usual housing 2, handle 6, support shoe 8, and cutting angle adjustment assembly 10. The cutting chain 4 is also of the well-known type having a plurality of cutting links or teeth which are driven around the chain bar 70 by means of the sprocket 64. However, and in accordance with the present invention, the worm driven circular saw 1 may be quickly and easily converted into a sprocket driven chain saw, or vice versa, by virtue of the unique compression adapter 20 which will be disclosed in greater detail herein.

The details of the compression adapter 20 are now described while referring concurrently to FIGS. 2, 3, 4 and 5 of the drawings. Adapter 20 is of unitary one-piece construction having an upper compression ring portion 22 coextensively formed with a lower base portion 24. The compression ring portion 22 has a generally ring-shaped configuration with a central opening 26 extending therethrough in which to receive a cylindrical member from the existing bearing plate (best shown in FIG. 6) of the circular saw of FIG. 1. A pair of compression legs 28 and 30 extend outwardly from a peripheral area of the ring portion 22. Compression legs 28 and 30 are aligned substantially parallel to one another so that a small gap 32 is formed therebetween. The size of the gap 32 and the dimensions of the central opening 26 through ring portion 22 can be selectively adjusted by tightening down a retaining bolt 34 against one of the compression legs (e.g. 28). That is, retaining bolt 34 extends through an aperture formed through each of the compression legs 28 and 30. A suitable retaining nut 36, or the like, engages the retaining bolt 34 at the other of the compression legs 30. By virtue of the compression legs 28 and 30 and the adjustable space 32 therebetween, the size of central opening 26 can be varied to receive cylindrical bearing plate members of different diameters. Once the compression adapter 22 has been suitably positioned so that the cylindrical member is received through the central opening 26, the retaining bolt and nut 34 and 36 are tightened together so as to compress the legs 28 and 30 and thereby prevent the accidental separation of compression ring portion 22 from the bearing plate.

A plurality (e.g. three) of alignment pegs 38 are extended through the compression adapter 20 at spaced peripheral areas of the compression ring portion 22. As will be described in greater detail hereinafter when referring to FIG. 6, the alignment pegs 38 are particularly located so as to be received within recesses formed within the existing bearing plate, whereby compression adapter 20 can be positioned over such bearing plate in an alignment which is suitable for connection to a conventional chain saw bar.

The base portion 24 of compression adapter 20 has a generally solid, rectangular configuration and includes an arcuately-shaped rise 40 (best shown in FIGS. 2 and 3) extending from a front face thereof and a rectangular depression 42 (best shown in FIGS. 4 and 5) formed in the rear face. As will be explained in greater detail when referring to FIG. 7, the rise 40 is dimensioned so as to engage the chain saw bar (designated 70 in FIGS. 1 and 7). The depression 42 is dimensioned so as to engage the chain saw safety guard (designated 80 in FIGS. 1 and 7). A stabilizer bar 44 extends upwardly from rise 40 so as to be received within a corresponding slot of the chain saw bar.

A series of screw holes extends through the rise 40 of base portion 24. More particularly, a pair of such holes 46 are formed at opposite sides of the rise 40 to receive screws therethrough for the purpose of securing the aforementioned safety guard to the rear face of the base portion 24 of adapter 20. A centrally disposed hole 48 extends through the rise 40 and stabilizer bar 44 to receive a screw therethrough for the purpose of securing the aforementioned chain saw bar to the front face of base portion 24.

Figure 6:
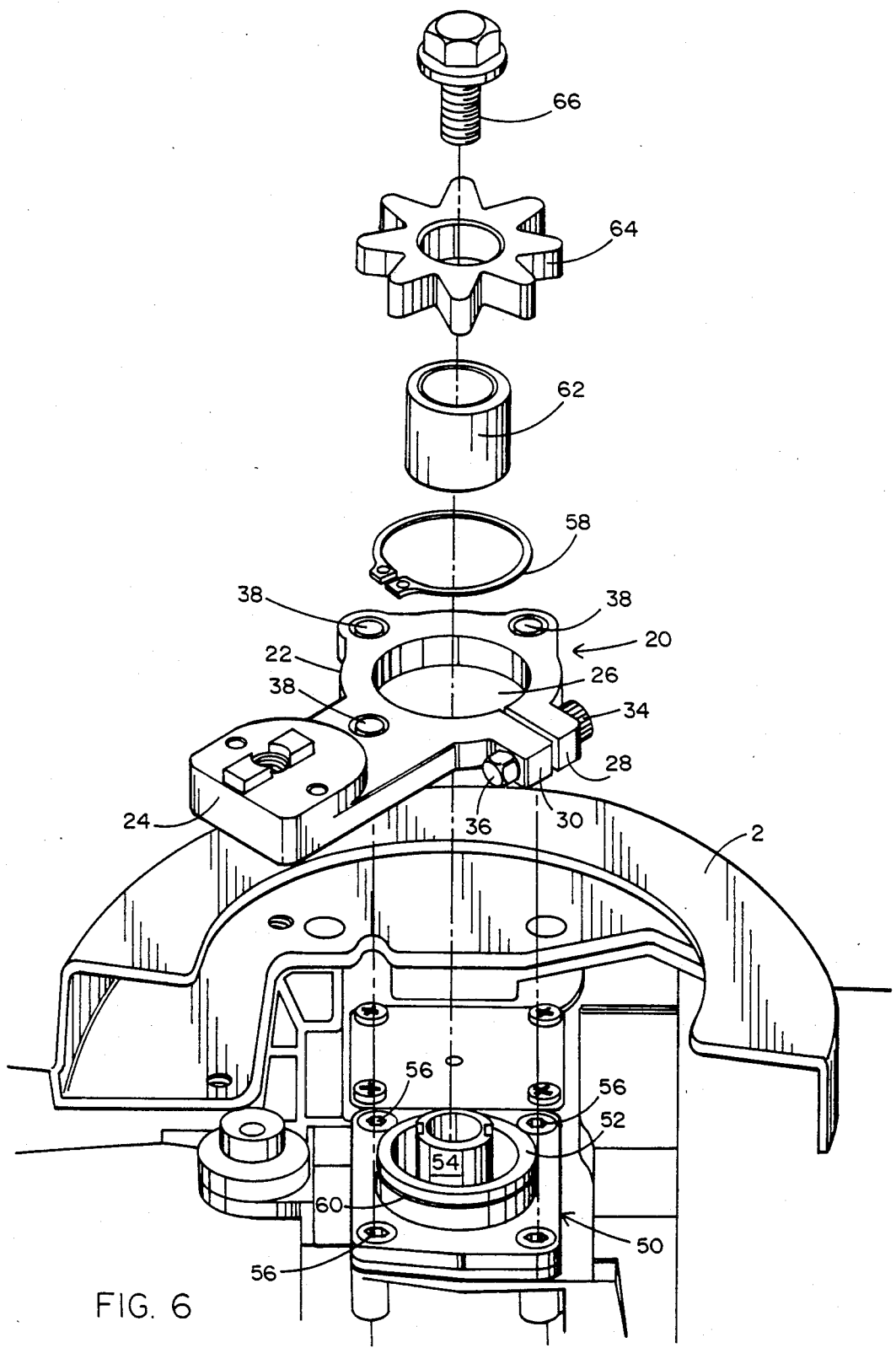
FIG. 6 illustrates the order in which the compression adapter and sprocket drive assembly of FIG. 1 are interconnected to the existing bearing plate of a circular saw.

A description of the manner in which the compression adapter 20 of FIGS. 2-5 is arranged in the assembled relationship with an existing bearing plate is provided while referring to FIG. 6 of the drawings. The conventional bearing plate 50 is located at the interior of housing 2. A centrally located cylindrical race 52 extends upwardly from bearing plate 50 and defines an opening through which a cylindrical rotor 54 extends. The rotor 54 is provided with a threaded interior.

In the past, a user was required to first remove the bearing plate 50 before a circular cutting blade could be replaced by a cutting chain, whereby to convert a worm driven circular saw into a sprocket driven chain saw. Such an operation was usually time consuming and sometimes difficult to accomplish. By virtue of the present invention, the bearing plate 50 need not be removed during the conversion of the circular saw. That is, the central opening 26 formed through the ring portion 22 of compression adapter 20 is sized to accommodate the cylindrical race 52 of bearing plate 50. To achieve the proper alignment of compression adapter 20 over bearing plate 50 with race 52 extending upwardly and through central opening 26, each of the alignment pegs 38 of adapter 20 is located so as to be respectively received within existing recesses 56 formed in the top of plate 50. Such recesses 56 are formed in the bearing plate 50 to receive connecting screws (not shown) which are counter-sunk therein. Once the proper alignment between adapter 20 and plate 50 is achieved, the retaining bolt and nut 34 and 36 are tightened against the compression legs 28 and 30 of ring portion 22 to reduce the size of opening 26 around the race 52 and thereby mate the compression adapter 20 to bearing plate 50.

An O-ring 58 is then positioned over compression adapter 20 and around the cylindrical race 52. A groove 60 is machined around the outer circumference of race 52 to receive the O-ring 58 therewithin. With the O-ring 58 located in groove 60 atop adapter 20, vibration and other operating forces will be unable to displace adapter 20 from its alignment with bearing plate 50.

A cylindrical spacer bushing 62 having a central opening extending therethrough is moved through the central opening 26 in adapter 20 and placed around the cylindrical rotor 54. A sprocket drive 64 also having a central opening extending therethrough is positioned over spacer bushing 62 so that the central openings in bushing 62 and sprocket 64 are in alignment with one another. The shank of a bolt 66 is located through the openings of bushing 62 and sprocket 64 and connected at the threaded interior of rotor 54. The connection of bolt 66 to rotor 54 preserves the alignment of sprocket drive 64 with rotor 54 by way of spacer bushing 62. The assembled relationship of compression adapter 20, O-ring 58, sprocket drive 64 and bolt 66 is best illustrated in FIG. 7 of the drawings.

Figure 7:
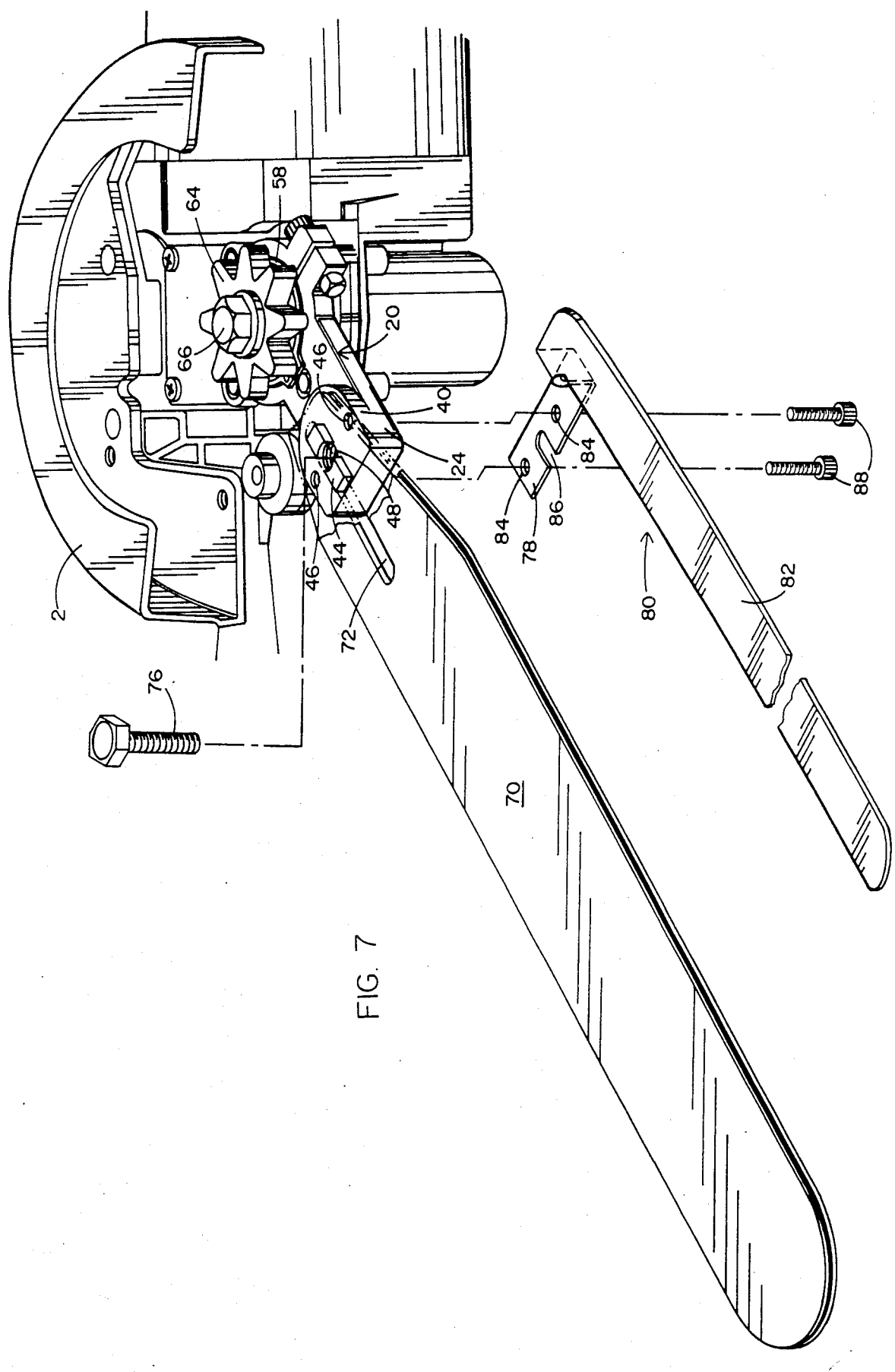
FIG. 7 shows the compression adapter and sprocket drive assembly of FIG. 6 interconnected in the assembled relationship with each other and with a chain saw bar and a safety guard.

Referring now to FIG. 7, the compression adapter 20 is shown connected at the interior of the housing 2 of a circular saw, whereby to quickly and easily convert the circular saw into a chain saw. More particularly, and as earlier disclosed when referring to FIGS. 2-5, the base postion 24 of adapter 20 has a rise 40 extending from the front face thereof, with a rectangular stabilizer bar extending upwardly from the rise 40. An existing chain saw bar 70 is connected to adapter 20 at the rise 40. That is, a slightly tapered end of bar 70 is positioned flush against the rise 40, so that stabilizer bar 44 extends through an elongated slot 72 formed in such tapered end. Thus, the (arcuate) configuration of rise 40 may be shaped to correspond with the tapered end of bar 70.

To vary the tension on a cutting chain (not shown), the position of the bar 70 relative to sprocket 64 may be adjusted by sliding the tapered end of bar 70 along the front face of rise 40 so that the stabilizer bar 44 moves through slot 72. Once bar 70 has been suitably positioned along rise 40 to obtain the desired tension on the cutting chain, a bolt 76 is located through the slot 72 and the central hole 48 formed in the stabilizer bar 44 so as to affix the chain saw bar 70 to compression adapter 20 with stabilizer bar 44 projecting through slot 72 to minimize the effects of vibration and other operating forces on the accuracy of the chain saw cut. Therefore, unlike the rough and hard to control cut which is characteristic of conventional chain saws, the secure connection of bar 70 to adapter 20 enables the cutting chain to make a relatively smooth, deep cut with both precision and accuracy.

As was also earlier disclosed when referring to FIGS. 2-5, a rectangular depression (designated 42 in FIGS. 4 and 5) is formed in the rear face of the base portion 24 of compression adapter 20. The depression is dimensioned so as to receive therein a connecting plate 78 of the chain saw safety guard 80. The connecting plate 78 is coextensively formed with an elongated tongue 82 which extends in the assembled relationship of FIG. 1 in generally spaced, parallel alignment with chain saw bar 70 in a substantially common plane.

Connecting plate 78 has a plurality of holes formed therein by which to connect the safety guard 80 to compression adapter 20. More particularly, a first pair of holes 84 are located so as to be in alignment with the screw holes 46 formed through the rise 40 of base portion 24. Another hole 86 is located so as to be in alignment with central hole 48 also formed through the rise 40 of base portion 24. A pair of screws 88 are inserted through holes 84 and 46, and the bolt 76 is inserted through the hole 86 so that connecting plate 78 of safety guard 80 is affixed to adapter 20. Thus, with the safety guard 80 connected to adapter 20 (in the assembled relationship of FIG. 1), a user of the chain saw will be better able to prevent injury as a consequence of an accidental contact with the cutting chain.

It will be apparent that while a preferred embodiment of the invention has been shown and described, various modifications and changes may be made without departing from the true spirit and scope of the invention. By way of example, the compression adapter 20 of the present invention is particularly suited to easily and quickly convert a worm drive circular drive saw with a 3 inch cut to a chain saw with a 12 inch cut. The adapter 20 has application with almost any commercially available circular saw. However, the placement of the alignment pegs (38 of FIG. 6) around the periphery of the ring portion of adapter 20 may vary depending upon the particular manufacturer and the location of the recesses (56) which are formed in each of the existing bearing plates. Moreover, by changing the size of the gap between the adjustable compression legs 28 and 30, the size of central opening 26 may be correspondingly varied to accommodate the existing cylindrical race member of almost any commercially available circular saw. Accordingly, and by virtue of the present invention, the user may avail himself of the existing circular saw mechanics to conveniently convert the saw into a chain saw.

Having thus set forth a preferred embodiment of the present invention, what is claimed is:

1. For a portable power driven circular saw including a housing, a rotor from which the circular saw blade has been removed, and a bearing plate connected within said housing and having a race extending outwardly therefrom for defining an opening in said plate through which said rotor extends, the improvement of an attachment device for converting the circular saw to a chain saw, said attachment device having a first end to be connected to said bearing plate and an opening in said first end through which a sprocket drive can be interconnected to said rotor for engaging a cutting chain, the first end of said device including a pair of legs arranged in spaced alignment with one another to define a gap therebetween and means by which to move said legs relative to one another to vary the size of said gap, the size of the opening in said first end being controlled by the size of said gap for receiving through said opening the race of said bearing plate, said attachment device having a second end to be connected to a chain bar to receive the cutting chain therearound and maintain said cutting chain in engagement with said sprocket drive.

2. The attachment device recited in claim 1, wherein said bearing plate has one or more existing holes formed therein in which to receive fastening means to connect said bearing plate within said housing, the first end of said attachment device having alignment means to be received in respective ones of the existing holes of said bearing plate for aligning said attachment device with said bearing plate when said first end is connected thereto.

3. The attachment device recited in claim 2, wherein said alignment means includes one or more pegs which extend outwardly from said first end and have a length sufficient to enable said pegs to be received within the existing holes of said bearing plate.

4. The attachment device recited in claim 1, wherein the second end of said device includes stabilizer bar means extending outwardly therefrom and through a slot formed in the chain bar when the chain bar is connected to said second end.

5. The attachment device recited in claim 1, further comprising alignment pegs extending from said first end and having a length sufficient to enable said pegs to be received in respective ones of existing screw holes formed in said bearing plate for aligning said attachment device with said bearing plate when said first end is connected thereto.

* * * * *